United States Patent
Qiu et al.

(10) Patent No.: US 7,639,792 B2
(45) Date of Patent: Dec. 29, 2009

(54) SYSTEM AND METHOD FOR LOCATION MANAGEMENT AND EMERGENCY SUPPORT FOR A VOICE OVER INTERNET PROTOCOL DEVICE

(75) Inventors: Chaoxin Qiu, Austin, TX (US); Richard L. Khan, San Ramon, CA (US); Robert F. Dailey, Austin, TX (US); Keith Joseph Allen, Austin, TX (US); Geoffrey R. Zampiello, Norwalk, CT (US)

(73) Assignee: ATT Knowledge Ventures, L.P., Reno, NV (US)

( * ) Notice: Subject to any disclaimer, the term of this patent is extended or adjusted under 35 U.S.C. 154(b) by 83 days.

(21) Appl. No.: 11/286,495

(22) Filed: Nov. 23, 2005

(65) Prior Publication Data
US 2007/0115935 A1    May 24, 2007

(51) Int. Cl.
*H04M 11/04* (2006.01)
*H04M 3/42* (2006.01)
(52) U.S. Cl. .................. 379/207.15; 379/37; 379/45; 379/51; 379/210.01
(58) Field of Classification Search .......... 379/37–51, 379/210.01, 207.15
See application file for complete search history.

(56) References Cited

U.S. PATENT DOCUMENTS

| 6,927,727 | B2 | 8/2005 | Clegborn |
| 7,260,186 | B2 * | 8/2007 | Zhu et al. .................. 379/45 |
| 2001/0022558 | A1 | 9/2001 | Karr, Jr. et al. |
| 2003/0146871 | A1 | 8/2003 | Karr et al. |
| 2003/0222819 | A1 | 12/2003 | Karr et al. |
| 2003/0222820 | A1 | 12/2003 | Karr et al. |
| 2004/0151283 | A1 | 8/2004 | Lazoff |
| 2004/0198386 | A1 | 10/2004 | Dupray |
| 2004/0266457 | A1 | 12/2004 | Dupray |
| 2005/0063519 | A1 | 3/2005 | James |
| 2005/0190892 | A1 * | 9/2005 | Dawson et al. ............ 379/37 |

\* cited by examiner

*Primary Examiner*—Melur Ramakrishnaiah
*Assistant Examiner*—Yosef K Laekemariam
(74) *Attorney, Agent, or Firm*—G. Michael Roebuck

(57) ABSTRACT

In a particular embodiment a system and method for processing a call in a Voice over internet protocol (VoIP) network are disclosed. The method includes receiving the call associated with a private identifier (PRID) at a server, classifying a call location based on the PRID and sending the call from the server to a Public Safety Answering Point (PSAP) with a call back number associated with the PRID. The system includes a first server interface for receiving a message containing a PRID associated with the call, a second server interface to access the data base for searching for the PRID in the data structure; a third server interface to receive an output from the database indicating whether a PRID has been found in the data structure; and a fourth server interface to send the call to a PSAP.

8 Claims, 11 Drawing Sheets

| VGID | PRID | Is_Internal_UE | IP_Address |
|------|------|----------------|------------|
| 001 | Joe_pri_h1@ims.sbc.net | Y | 67.32.32.100 |
| 001 | Joe_pri_h2@ims.sbc.net | Y | 67.32.32.100 |
| 001 | Joe_pri_pc@ims.sbc.net | N | 67.32.32.100 |
| 001 | Joe_pri_pda@ims.sbc.net | N | 67.32.32.100 |
| 002 | mike_pri_h1@ims.sbc.net | Y | 68.54.54.103 |
| 002 | mike_pri_h2@ims.sbc.net | Y | 68.54.54.103 |
| 002 | mike_pri_pc@ims.sbc.net | N | 68.54.54.103 |
| 001 | mike_pri_laptop@ims.sbc.net | N | 68.54.54.103 |

FIGURE 3

SYSTEM AND METHOD FOR LOCATION MANAGEMENT AND EMERGENCY SUPPORT FOR A VOICE OVER INTERNET PROTOCOL DEVICE

BACKGROUND

1. Field of Disclosure

The disclosure relates to the field of voice over internet protocol (VoIP) emergency call services.

2. Description of the Related Art

All telecommunication providers in the United States are now required by FCC rules to support 911 emergency call services. Based on these rules, when a telephony user dials 9-1-1, the telecommunication carrier must be able to process the call with the originating location information and route the 911 call to an appropriate PSAP (Public Safety Answering Point) Center that serves the caller's current location. For traditional PSTN (Public Switched Telephony Network) providers, the 911 support is based on the fact that telephone numbers are tied to fixed locations. Telecommunication providers usually store a subscriber's location (street address, etc.) in a database associated with an assigned telephone number (call back number (CBN)) during the subscriber service activation. When a user makes a 911 call, his calling telephone number (CBN) from the incoming call signal can be used to look up a caller's location information, and use the retrieved information to route the 911 call to a serving PSAP proximate to the caller's location.

The introduction of Voice over IP (VoIP) technology raises a different challenge to service providers to support 911 services. This is because a VoIP user can easily move his/her VoIP phone from one location to another, plug in to a visited local area network (LAN), register to the VoIP service provider, and start to make and receive phone calls at the new location. This mobile capability of VoIP phones eliminates the dedicated correlation between telephone number and a user physical location.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

FIG. 3 is a schematic diagram depicting an illustrative embodiment showing a data structure for classifying an emergency call;

DETAILED DESCRIPTION OF THE DRAWINGS

Figure 1:
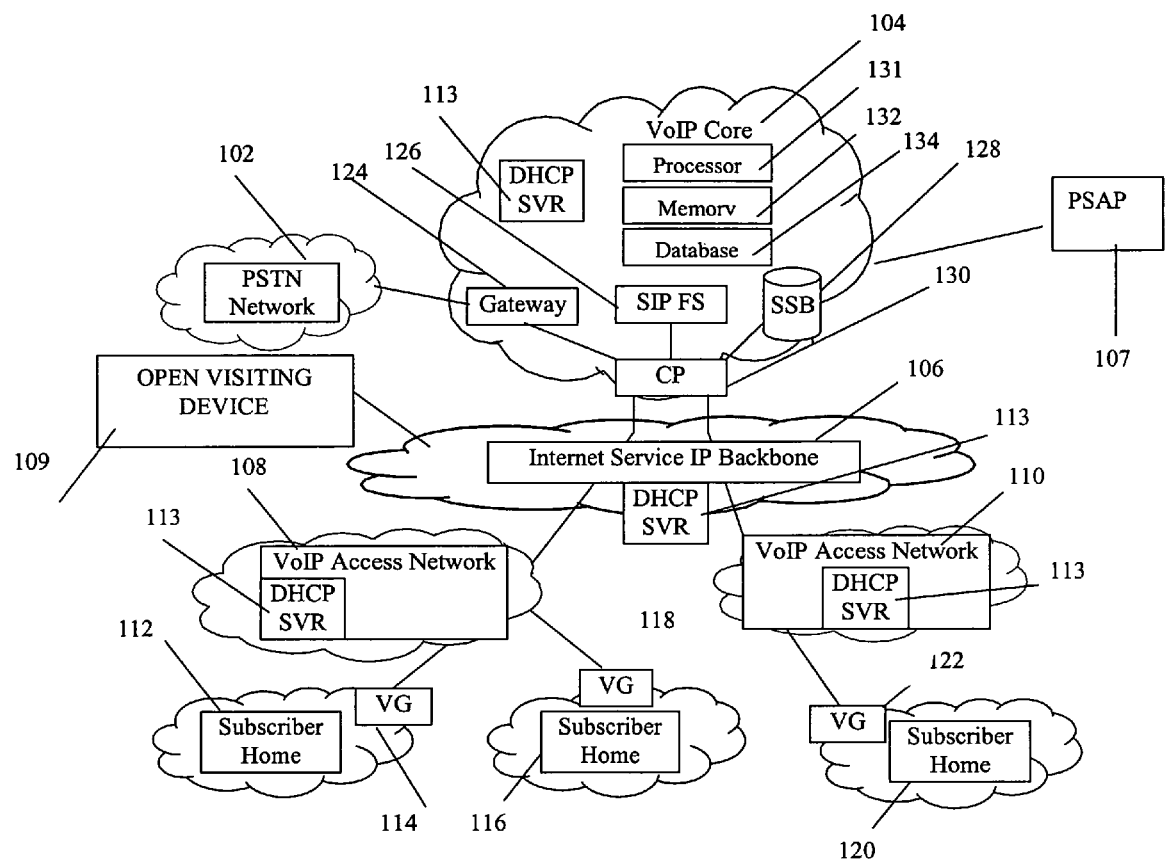
FIG. 1 is a schematic diagram depicting an illustrative embodiment showing a VoIP network.

In view of the above, an illustrative embodiment is presented through one or more of its various aspects to provide one or more advantages, such as those noted below. In a particular illustrative embodiment a method is presented for processing a call in a Voice over internet protocol (VoIP) network including receiving a private identifier (PRID) associated with the call at a server, classifying a call location mobility based on the PRID; and sending the call from the server to a public safety answering point (PSAP) with a call back number (CBN) associated with the PRID. In another particular embodiment the PUID includes a user equipment (UE) device identifier that further includes reading a flag in a data structure associated with the PRID to determine if the UE associated with the PRID is at least one of the set consisting of a fixed location, updating an internet protocol (IP) address in the data structure for all VoIP devices at a same VoIP gateway as the UE associated with the PRID with the IP address for the UE associated with the PRID, and sending a CBN associated with the fixed location if the UE is at the fixed location. In another particular embodiment classifying the call location further includes comparing a VoIP access port internet protocol address for the visiting location with a public internet protocol address in the data structure for the PRID, if the UE is at the visiting location, to determine if the VoIP access port is at a known location and returning a call back number for the VoIP access port if the VoIP access port is at a known location.

In another particular embodiment in the method sending further includes inserting a location not verified disclaimer in the call when the VoIP access port location is not at a known location. In another particular embodiment the method further includes requesting a location further from at least one of a set consisting of a caller, global positioning system (GPS), wireless fidelity (WIFI) proximity, cellular triangulation, WIFI proximity and a national database. In another particular embodiment the method further includes the PRID is received in a session initiation protocol (SIP) message from a VoIP device to the server In another particular embodiment a system for processing a call in a Voice over internet protocol (VoIP) network is disclosed including a database in memory for storing a data structure for classifying a location mobility of a device associated with the call and a server coupled to the database. The server includes a first server interface to receive a message containing a PRID associated with the call, a second server interface to access the data base for searching for the PRID in the data structure, a third server interface to receive an output from the database indicating whether a PRID has been found in the data structure; and a fourth server interface to send the call to a PSAP.

In another particular embodiment the first server interface receives a session initiation protocol message containing the PRID from a VoIP device. In another particular embodiment the system further includes a computer readable medium accessible to the server and a computer program embedded within the computer readable medium. The computer program includes instructions to compare the PRID to a PRID field in the data structure and instructions to read a flag in the data structure associated with the PRID to determine if the PRID is associated with a fixed location. In another particular embodiment the computer program further includes instructions to compare a VoIP access port internet protocol address with an internet protocol address for the PRID to determine if the VoIP access port is at a known location and instructions to return a call back number for the VoIP access port when the VoIP access port is at a known location.

In another particular embodiment the computer program further includes instructions to insert a location not verified disclaimer in the call when the VoIP gateway location is not known. In another particular embodiment the computer program further includes instructions to request a location further from at least one of a set consisting of a caller, global positioning system (GPS), WIFI, triangulation and a national database.

In another particular embodiment a computer readable medium is disclosed having stored thereon a data structure for storing identification information for a VoIP calling device. The data structure includes a private identifier field for storing a private identifier associated with the calling device and an internal flag field for storing a flag indicating a device is a fixed location device. In another particular embodiment the data structure further includes a public internet protocol address field for storing a public internet address for the calling device. In another particular embodiment the data structure further includes a gateway identifier field for storing a VoIP gateway identifier associated with the calling device.

In another particular embodiment a computer readable medium is disclosed containing instructions that when executed by a computer perform a method for sending a call in a Voice over internet protocol (VoIP) network. The method further includes sending a private identifier (PRID) associated with the call to a server for classifying a call location based on the PRID and sending the call to a public safety answering point (PSAP). In another particular embodiment the PRID is contained in a session initiation protocol message from a VoIP device to the server. In another particular embodiment classifying the call location further includes comparing the PRID to a PRID field in a data structure in a server database and reading a flag in the data structure associated with the PRID to determine if the PRID is associated with a fixed location.

In another particular embodiment comparing the PRID to a PRID field in the data structure further includes comparing a VoIP access port internet protocol address with a public internet protocol address for the PRID to determine if the VoIP access port associated with the PRID is at a known location and returning a call back number for the VoIP access port when the VoIP access port is at a known location. In another particular embodiment the method further includes inserting a location not verified disclaimer in the call when the VoIP access port location is not at a known location.

In an illustrative embodiment, an FCC compliant VoIP E911 solution should be able to deliver a 911 call along with CBN to an appropriate PSAP. The CBN serves as the key to the caller's location under existing PSAP infrastructure. Meeting this requirement could be problematic if VoIP customers are allowed to use their phones from anywhere in the U.S. Thus, in a particular illustrative embodiment the ability to verify the locations from which VoIP customers use their phones is important. In a particular illustrative embodiment a system, method and data structure are disclosed that allows a VoIP provider to determine the possible locations from which VoIP customers can use their phones without entering a location.

In an illustrative embodiment a VoIP network system is disclosed that manages the location for all VoIP phones in a VoIP service network area. The VoIP network routes a 9-1-1 call from any VoIP phone to an appropriate PSAP office based on a calling location. The VoIP network allows a VoIP phone device to connect for service from those locations registered with the VoIP network provider. Registered phone devices provide location information that can be managed and available to a VoIP call processing system. Three options are disclosed. Option 1 (No visiting, no nomadic usage referred to as Nomadic Blocking): All VoIP phone devices can only be used from the subscriber's location registered at service activation (i.e., typically the subscriber's own residence). Option 2 (No visiting, but allow for limited nomadic usage referred to as Nomadic Visiting): All VoIP phone devices can only be used from any one of VoIP subscriber's registered locations (for example, a VoIP subscriber can use his device at another subscriber's home). Option 3 Open Visiting, open nomadic usage from any location with additional location information or a disclaimer added to the call.

In an illustrative embodiment a management framework and signaling design are disclosed to enable a VoIP call processing system to track the locations from which a VoIP phone device can connect to emergency services. A design is provided within a VoIP call processor that enables the 9-1-1 call handling and routing for VoIP devices from a verifiable location. The same approach can further be applied to allow a VoIP phone device to connect to the network if it is accessing the VoIP network from an unverifiable location by processing the 911 call with additional location information and a disclaimer.

In an illustrative embodiment, the management framework and signaling design provide several advantages over all other E911 location management designs currently deployed. The illustrative embodiment is user friendly since it doesn't require user interaction to implement the illustrative embodiment during the lifespan of the service. The VoIP network stores the subscriber location in a server database upon service activation as a part of a provisioning procedure. It is self-managed and thus scalable.

In an illustrative embodiment, the location management framework doesn't rely on any physical medium access control (MAC) addresses that may be difficult to traverse through a wide area network (WAN) network, and doesn't rely on any out-of-band management systems. The illustrative embodiment allows VoIP phone devices to be dynamically assigned and configured using a dynamic host configuration protocol (DHCP) server. The illustrative embodiment discloses an efficient in-band signaling approach that doesn't require any additional signaling packets to manage the location information for VoIP devices. The call processing information is extracted from VoIP call signaling messages.

Using the location management framework, the call processor can handle and route the E911 calls based on the IP address of the incoming VoIP signaling packet and the location information stored in the network that is linked to the IP address of the VoIP phone device. In an illustrative embodiment, the IP address to location mapping can be managed and used even when the IP address can be changed (re-assigned) dynamically.

The illustrative embodiment discloses a framework and signaling approach to manage VoIP network user end point locations such as VoIP Gateways (VGs). Coupled with this location management architecture is a call processing enhancement provided in VoIP call processing components that enables the VoIP network to process and route the emergency (E911) calls to an appropriate PSAP based on the location information in the VoIP network database.

In a particular embodiment, the system allows VoIP user equipment (UE) to connect to the VoIP network for service from UE owner's registered location, which is typically a customer's residence. A customer cannot connect his VoIP UE from other locations outside of his own residence. The customer can only call from his fixed location. The fixed location has a permanent physical address. This embodiment is referred to as "Nomadic Blocking". In a second particular embodiment referred to as "Nomadic Usage", the Nomadic Usage embodiment allows a VoIP UE to travel away from the fixed permanent address to visit and connect to the VoIP network for service from any VoIP subscriber's registered VoIP gateway location, which is typically another customer's residence. For example, a VoIP subscriber can take his/her VoIP UE to another VoIP network subscriber's residence (visited location) and connect to VoIP network. The illustrative embodiment enables the correct routing should this VoIP subscriber call 911 from the visited location. In a third particular embodiment referred to as "Open Visiting", a subscriber customer can connect his VoIP UE to the VoIP network from any location including non-registered locations.

Turning now to FIG. 1, FIG. 1 is a schematic diagram depicting a VoIP network 100 environment in accordance with an illustrative embodiment. As shown in FIG. 1, the VoIP network 100 environment includes but is not limited to a PSTN network 102, a VoIP Core 104, an internet service IP backbone 106, a VoIP access network 108, 110, PSAP 107, open visiting device 109 and VoIP network subscriber homes 112, 116, and 120.

The VoIP Core 104 includes processor 131, memory 132 coupled to the processor 131, and database 134. The memory 132 can include a computer program that is embedded in the memory 132 that can include logic instructions to perform one or more of the method steps described herein. Additionally the database 134 containing the data structure 300 is coupled to the processor 131.

The VoIP Core 104 includes but is not limited to a gateway 124, a session initiation protocol feature server (SIP FS) 126, a Subscriber and Service data base (SSB) 128 database, and a Call Processor (CP) 130. The subscriber homes 112, 116, and 120 include but are not limited to a VoIP access device or port including but not limited to a VoIP Gateways (VGs) 114, 118, and 122.

The VoIP service can be offered to customers as a wireline based residential primary line service, though some small offices may also subscribe. Each network subscriber's site connects to the VoIP network using a network access device, including but not limited to a VoIP Gateway (VG) 114.

Figure 2:
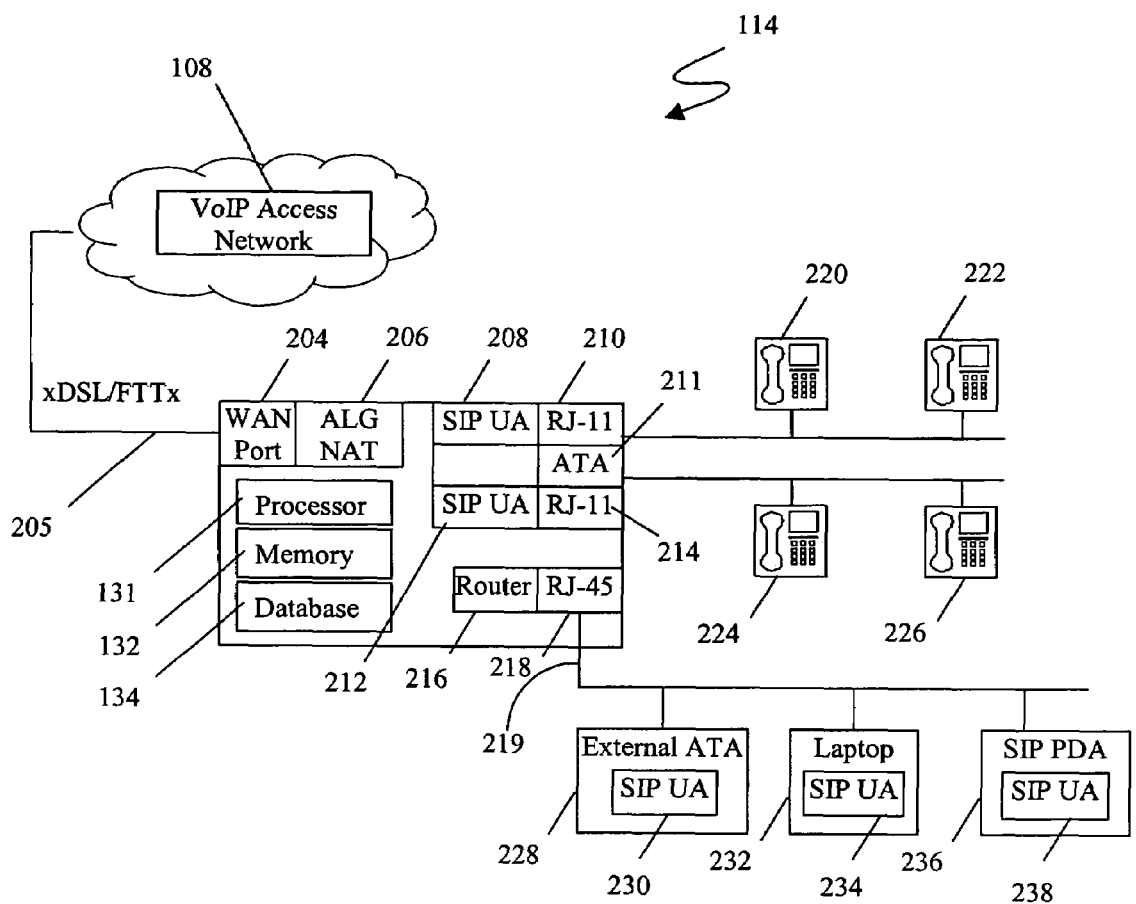
FIG. 2 is a schematic diagram depicting an illustrative embodiment showing a VoIP gateway.

FIG. 2 illustrates a conceptual model of the home VG (also referred to as a VoIP access port) and VoIP UEs. The VoIP subscribers access the VoIP Network 108 via the VoIP Gateways (VGs) 114, 118, 122. The VGs are not moved from one location to another location without the owner calling to the VoIP network provider and re-provisioning the VoIP VG subscription in the VoIP network. Attempts at accessing the VoIP Core by VoIP UEs from other access networks can be blocked or flagged by the firewalls protecting the VoIP Core.

Turning now to FIG. 2 in an illustrative embodiment, a VoIP Gateway 114 provides access to the VoIP access network 108. An emergency call originating from a phone 220, for example, is sent to the access network 108 through and RJ-11 210, WAN Port 204, using ALG NAT 206, and session initiation protocol user agent (SIP UA) 208. An emergency call can also be placed through external ATA 228 through RJ-45 218 through router 216 to the VoIP network 108. The emergency call can be sent to RJ-45 218 using SIP UA 230 of external ATA 228 or SIP UA 234 of laptop 232 or SIP UA 238 of SIP PDA 236.

The VG includes processor 131, memory 132 coupled to the processor 131, and database 134. The memory 132 can include a computer program that is embedded in the memory 132 that can include logic instructions to perform one or more of the method steps described herein. Additionally the database 134 is coupled to the processor 131.

In a non-limiting illustrative embodiment, each VoIP Gateway (VG) 114 contains but is not limited to a WAN port 209 for connecting to the VoIP network. The VoIP network access connection 205 can be DSL over FTTx (fiber to the premises (FTTP), fiber to the node (FTTN)) optical access lines.

The VG includes an application layer gateway (ALG) and network address translation (NAT) 206 function maps private IP addresses for devices 220, 222, 224, 226, 228, 232, and 236 in the home network to the public IP address assigned to the WAN access port. 1 to 4 RJ-11 ports 210, 214 are provided in the VG that can support 1 to 4 analog lines. At least one of these RJ-11 ports will be activated when a customer subscribes for VoIP service. For most customers who have one phone line (and one phone number) at home, the phone number will be assigned to one of these RJ-11 ports.

A built-in analog terminal adapter (ATA) 211 module is provided in the VG that serves as a VoIP session initiation protocol (SIP) to analog line adapter. Internally, the built-in ATA creates one SIP User Agent (SIP UA) image per RJ-11 port when an analog device such as a phone 220, 222, 224 or 226 is connected to the home network. A RJ-45 port 218 with a built-in home Ethernet router 216 module is also provided in the VG with external ATA 228. The RJ-45 port 218 can be connected with a home LAN router 216 as an uplink to the VoIP network through a communication network, for example, the internet. The home LAN can also connect with other TCP/IP based devices, including SIP-based VoIP devices (VoIP UEs) such as laptops 232 SIP phones, PDAs 236, and SIP based softphones installed and run on PCs.

In a non-limiting illustrative embodiment, each VG has a built-in ATA 211. Thus the built-in ATA provides a fixed known location associated with the VG provisioning address and phone number in which the built-in ATA is installed. As discussed above, the built-in ATA creates a SIP UA for each active analog line. These internal SIP UA(s) 208, 212 are the first SIP devices to register with VoIP core 104 when a VG is booted (for the first time or after power recycle). Other VoIP UEs are able to register after the VG successfully finishes boot-up and the VG-internal SIP UAs 208, 212 have successfully registered. If other VoIP UEs try to register before the VG-internal SIP UAs have successfully registered, they will fail (but re-try a few minutes later will succeed).

VoIP network customer care personnel or automatically generated announcements can be used to alert VoIP subscribers that they should wait until the VG completes its boot procedure before they try to do anything with other VoIP UE devices. The WAN port 204 of each VG is assigned a public IP address by the DHCP server 113 in the VoIP access network 110 or the Internet Service network (IS). The VG performs network address translation (NAT)/application layer gateway (ALG) to translate between private IP and public IP addresses for all SIP messages going in to and out of the VG to and from the VoIP network. In a non-limiting illustrative embodiment, each SIP UA, per VoIP network standard, has a unique Private User Identity (PRID) and a Public User Identity (PUID). In the illustrative embodiment, the PUID is a telephone number assigned to the UE by the VoIP service provider. Both PRID and PUID are provisioned by the VoIP provider operators when a customer subscribes to a VoIP service or adds an additional line to an existing VoIP service.

When a new customer subscribes to a telephony service or a existing subscriber adds a phone line to the service, the VoIP service provider performs the following provisioning work: A phone number (or multiple phone numbers) is allocated and assigned to the subscriber. The phone number and related service information are provisioned into the telephone call processors responsible to the service, such as telephony switches. The phone number (or calling line identifier) and its location address are provisioned into service provider's automatic location identification (ALI) Database.

When a user calls 9-1-1, the service provider's switching network performs origination number based routing and routes the call to a PSAP (typically using centralized automatic message accounting (CAMA) trunks). The PSAP personnel will then be able to look up the address of the caller based on the originating telephone number (TN) also referred to herein as the call back number (CBN). In an illustrative embodiment, call processing responsibility is distributed into several VoIP network components that are inter-connected using standard based communication interfaces as shown in FIG. 1.

The SSB 128 VoIP network component provides a call processing database. Each subscriber can be provisioned with multiple service profiles that are identified by Private User Identity (PRID), Public User Identity (PUID), and other subscriber credentials. Each service profile identifies a set of call processing features subscribed by (or available to) the user. The PUID typically corresponds to telephone number assigned to a particular VoIP UE device. The CP 130 VoIP network component performs call session control functions and handles functions such as SIP REGISTER (for establishing an access to the network) and SIP INVITE (for call setup). When a VoIP UE registers, CP downloads the corresponding user profile from the SSB 128 database. A SIP Feature Server (SIP FS) 126 is responsible for VoIP call feature processing, such as call forward, call hold, simultaneous ringing, etc. The SIP FS provides an interface with the SSB database. SIP FS stores the VoIP call feature data in the SSB database 128 and uses the data to process originating and terminating calls for the subscriber. The VoIP SIP FS may provide a standard interface with SSB or can use a local database to process the call features. In particular, a translation table can be stored and processed in SIP FS. The translation table is setup such that 911 calls can be routed to an appropriate 911 trunk based on the calling telephone number (TN) or CBN.

The PSTN GW (Gateway) 124 consists of but is not limited to a Signaling Gateway that interacts with a Signaling System 7 (SS7) network, Media Gateway Control Function and Media Gateway Functions. Media Gateways may provide specialized 911 trunks to connect to PSTN networks. At the service activation time for either a new subscriber or an existing subscriber adding a new line, VoIP service provider operators can provision sufficient call processing information in the SSB for service profiles. Call processing information includes but is not limited to the service profile which includes the PRID and PUID (assigned telephone number for the new service).

Referring now to FIG. 3, in a non-limiting exemplary embodiment conceptually in the SSB database, a data structure 300 is provided (though it can be implemented in various ways) that contains the following fields of information for each VoIP subscriber: VG ID 302 field: A numerical identifier that has one-to-one relationship with each VoIP Gateway (VG) registered in a VoIP network; PRID 304 field: Private User Identity for each VoIP user equipment (UE) owned by the subscriber/owner of the VG; Flag (Is_Internal_UE) 306 field: A binary flag that is set to "Y" if the UE is internal to VG and set to "N" if the UE is external to VG; and an IP Address 308 field: The public IP address is assigned to the VG's WAN port by the DHCP server 113 in the VoIP network.

The data structure 300 groups all VoIP UE devices for a particular VG ID together. The data structure 300 indicates in the IS_Internal_UE field 306, which PRIDs are associated with UE devices that are in a fixed location, that is, will not visit (UE devices associated with an ATA internal to the VG) and which PRID are associated with those UE devices that can visit (which are external to VG). The PRID indicates the location mobility for a UE device, that is, whether the UE device is at a fixed location when the IS_Internal_UE flag is set to "Y" or the UE device can visit when the IS_Internal_UE flag is set to "N". A data structure field indicates the public IP address 308 of the WAN port in the VG associated with the VG ID. At the provisioning the VG for service activation, the data for VG ID 302, "Is_Internal_UE" 306, and PRID 304 are entered together with other data regarding service profiles in to the data structure 300. This information is available in the VoIP network database (SSB) after a subscription is entered. The "IP_Address" 308 is not entered manually by operator but is updated automatically after the VG is booted and the internal ATA has created a SIP agent that successfully registers with the VoIP Core 104.

In a non-limiting illustrative embodiment, each VoIP subscriber has an VG installed that doesn't move and has a built-in SIP UA (the internal ATA). Using SIP REGISTER messages from these VG internal SIP UAs, the VoIP service provider maintains knowledge of the VG's public IP address. The knowledge of the VG IP address can be used to resolve the location address information for VoIP UEs that may or may not visit. The ability to discern whether a UE device can visit and to verify a UE device's known location helps to enable call processing and routing for E911 calls from any VoIP UEs that are connected to the VoIP network.

When a VG 114 is booted from power on (or rebooted), the VG acquires a public IP address for its WAN port 204 from a DHCP server 113 in the VoIP access network. The VG's built-in ATA then sends a SIP REGISTER message to register with the VoIP Core 104. The REGISTER message contains the internal ATA's private user ID and the associated VG's public IP address when it reaches the VoIP core. This is due to the ALG function in the VoIP Gateway. After the VG boot up and registration for internal SIP UAs completes, other (external) VoIP UE devices are able to connect and register to the VoIP Core.

When the CP 130 processes a SIP REGISTER message, CP extracts from the SIP REGISTER message the following information and sends it to the SSB in a User Agent Register (UAR) message in its contact header via Cx interface: the ATA's private user ID; VG's public IP address; and ATA's public user ID (i.e., the TN or CBN). SSB compares the Private User ID (PRID) against the data structure 300 PRID 304 fields column. If SSB finds a match in the data structure 300 PRID 304 fields column and the matched PRID entry "Is_Internal_UE" flag 306 is set to "Y" 326, the address is known as the UE is using a fixed internal ATA is at the server address as the VG in which it is built-in. SSB updates the IP address field 308 in the data structure 300 for the corresponding matching entry with the IP address in the UAR message. SSB then proceeds to find all other entries in the data structure 300 that have the same VG ID 302, and updates their IP address 308 as well.

SSB then proceeds with the registration procedure for the requesting UE. If SSB finds a match in the data structure 300 and the matched entry's "Is_Internal$_{13}$ UE" flag is set to "N", the UE is not at a fixed known address. SSB processes the SIP REGISTER based on VoIP network policy described below in relation to FIGS. 4-8. If the SSB can not find a match for the PRID received in the UAR message, then SSB injects a disclaimer into the SIP REGISTER and requests the caller or an alternative location service to enter a CBN for a location or an addressor location or address.

In a particular illustrative "Nomadic Blocking" embodiment, the VoIP network system allows a VoIP UE to connect to the VoIP network for service ONLY from the UE owner's registered location, which is typically at the subscriber's residence. In the Nomadic Blocking embodiment a subscriber cannot connect his VoIP UE from other locations outside of his own residence. Call Processing for "Nomadic Blocking" proceeds as follows: for a new customer or an existing customer who would like to add a new VoIP UE (with a new telephone number), an operator will provision appropriate service data, including data structure field entries as described below (as shown in FIG. 3). If this is a new data structure entry, then data structure fields "VGID" 302, "PRID" 304, and "Is_Internal_UE" 306 are provisioned and "IP_address" 308 is empty.

In the illustrative embodiment, every VoIP UE registers (Using SIP REGISTER) before making a call (using SIP INVITE) or performing other functions. If the VoIP call processor (CP) detects that a VoIP UE hasn't registered when the UE sends a SIP INVITE, then the VoIP call processor will insert a "Location not verified" disclaimer in the SIP INVITE and send a request to the VoIP UE to register before re-sending the SIP INVITE. Call processing procedures discussed below consider the cases for SIP REGISTER, SIP INVITE and other SIP messages.

If the SIP message is NOT a SIP REGISTER, then the following procedures apply: The SSB compares the Private User ID against the data structure 300. If SSB finds a match in the PRID field 304, SSB compares the IP address from the SIP message (i.e., from the UAR message from CP) with the "IP_address" field in the data structure for the matching entry. If they match, the SSB proceeds with the SIP procedure. If the SSB cannot find a match for the Private User ID received in the UAR message, then the SSB injects a "location not verified" disclaimer into the SIP message. SSB also requests an address or a CBN for an address from the caller or from an alternative location service (GPS, WiFi, etc.). This procedure ensures that all VoIP UEs can access the VoIP network via the VG that belongs to the VoIP UE's owner. In a particular non-limiting embodiment, since the location address for the VG has been provisioned, it will ensure that when a 9-1-1 call is placed from an active VoIP UE, the location for the accessing VG can be used for call routing to appropriate PSAP and the PSAP answering personnel can retrieve the correct location address from the provisioned database (ALI DB).

In another particular embodiment, Nomadic Usage is provided. Nomadic usage allows a VoIP UE to connect to the VoIP network for service from ANY VoIP subscriber's registered location, which is typically a subscriber's residence. For example, a VoIP subscriber can take his/her VoIP UE to another VoIP subscriber's residence and connect to VoIP service through a visited VG. This design enables the correct PSAP routing should this user call 911 from the visited VG location. The key difference between "Nomadic Blocking" and "Nomadic Usage" is that "Nomadic Blocking" allows a VoIP UE subscriber to use only VoIP emergency call services from his own location (residence, e.g.) and "Nomadic Usage" allows VoIP UE be used from any other VoIP subscriber's location (as long as a VG is installed, registered and activated). In another particular embodiment, Open Visiting allows processing of an emergency call from a non registered VG. In a non-limiting illustrative embodiment, in the Open Visiting scenario, a "location not verified" disclaimer is inserted in the call to a PSAP. A customer can also connect his VoIP UE from a non-VoIP subscriber's registered location in an Open Visiting embodiment. Open Visiting is discussed in more detail below.

In a non-limiting illustrative embodiment, in a Nomadic Usage scenario, when the VoIP CP processes a SIP message, CP extracts the following information from the SIP message and sends the information to SSB in a UAR message via Cx interface: ATA's private user ID (PRID); VG's public IP address to SSB in its contact header; and ATA's public user ID (PUID) (i.e. the TN or CBN). If the SIP message is a SIP REGISTER, then the following procedures apply: The SSB compares the Private User ID against the table. If SSB finds a match in the table and the matched entry's "Is_Internal_UE" flag is set to "Y", the SSB updates the "IP_address" field in the table for the corresponding matching entry with the IP address in the UAR message.

SSB then proceeds with the registration procedure for the requesting UE. If SSB finds a match in the data structure 300 PRID field 304 and the matched entry's "Is_Internal_UE" flag is set to "N", then the UE is not at a fixed known location and can visit. The SSB can then compare the IP address from the SIP message against the data structure "IP_address" fields 308 column. SSB looks for a match against one of the IP_Address field entries 308. Note that a match is possible with potentially two different data structure field entries: the first field entry match is the one with a matched PRID and the second entry match is the one with a matched IP address. The former match entry is referred to as "Home Entry" and latter match entry as "Visited Entry". The "Visited Entry" may or may not be the same with "Home Entry". The SSB updates the "IP_address" field of the "Home Entry" with the IP address from the incoming SIP REGISTER message. SSB then proceeds with the registration procedure.

If the SIP message is a 9-1-1 emergency call, SSB matches the PRID and the IP address of the incoming SIP INVITE message against the "PRID" and the "IP_address" field columns of the data structure. If a match is not found (meaning that the VoIP UE hasn't properly registered with the system), the caller or a location service is asked for a location and a "location not verified" disclaimer is inserted. SSB will cause the VoIP UE to perform registration first and call again (automatically). If a match is found, the SSB finds another data structure field entry that has the same VGID and has its "Is_Internal_UE" flag set to "Y". The SSB then compares the IP address of the two entries. If the two IP addresses match (meaning that calling VoIP UE is calling from the home location), the 9-1-1 call processing proceeds as normal.

Otherwise if the two entries do not match, the calling VoIP UE is calling from a visited location. SSB uses the IP address of incoming SIP INVITE message to find another entry in the data structure that has "Is_Internal_UE" flag set to "Y". The second match entry is a "Visited VG" for the calling VoIP UE. The SSB uses the PUID and the PRID of the "Visited VG" to process and route the 911 call. SSB causes the VoIP network to route the 911 call to a PSAP according to the visited VG location and PSAP will be able to use the PUID (i.e., a telephone number) of the "Visited VG" to look up the caller's address in the ALI DB. If the SIP message is not a SIP REGISTER OR a SIP 911 call, then the following procedures apply: SSB compares the Private User ID against the PRID field in data structure 300. If SSB finds a match in the data structure 300, SSB proceeds with the SIP procedure. If SSB can not find a match in the data structure 300 for the Private User ID in the UAR message, then SSB inserts a "location not verified" disclaimer into the SIP message and processes the 911 call. Note that the system, method and data structure described in this non-limiting illustrative embodiment can be applied to other calls that utilize the call originating number knowledge, for example, other N11 calls and government emergency telecommunications service (GETS) ("710" calls, e.g.).

Figure 4:
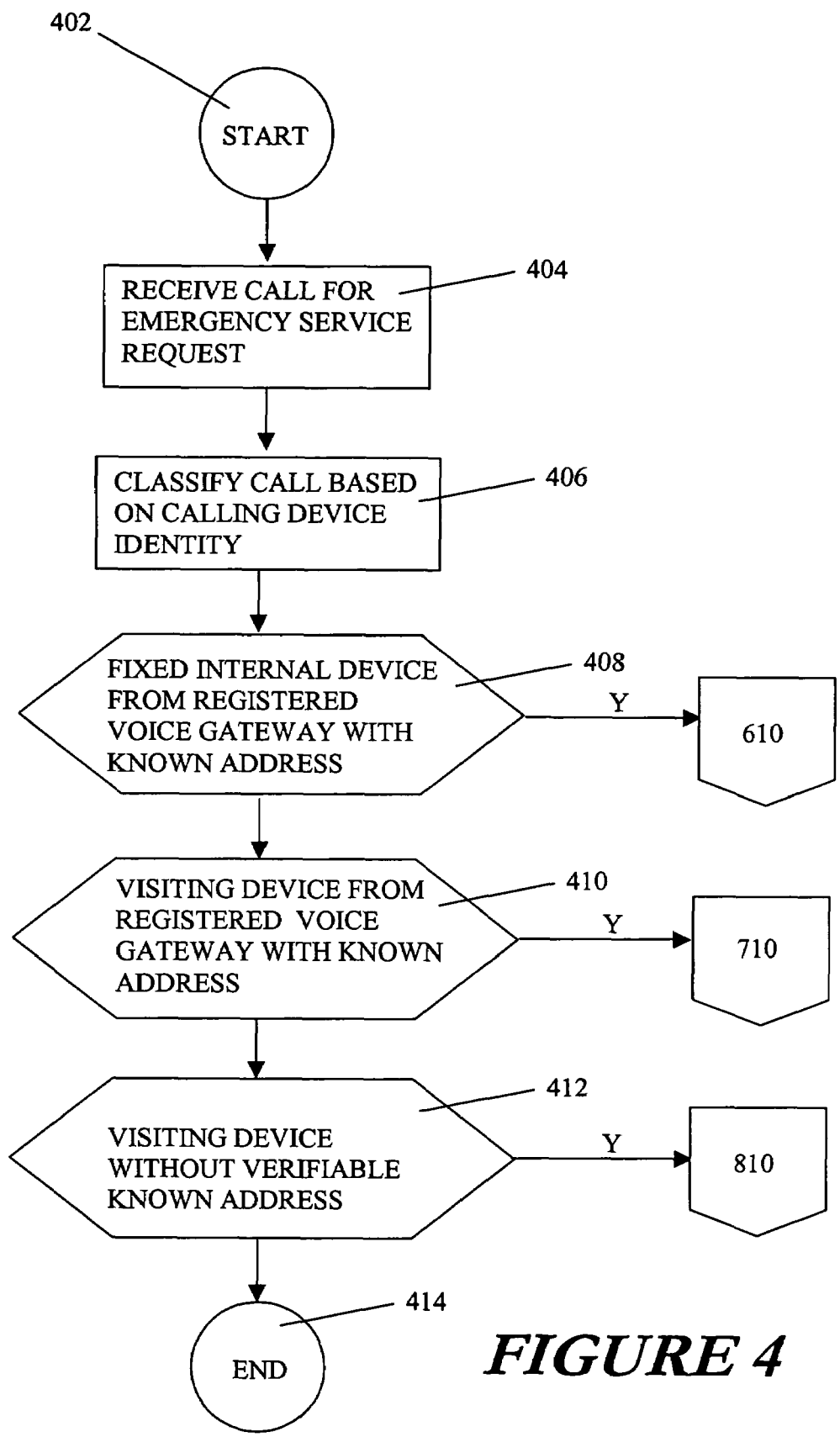
FIG. 4 is a flow chart showing call processing to classify an incoming call in a particular embodiment.

Turning now to FIG. 4, a flow chart illustrates a method 400 in an illustrative embodiment. The method 400 starts at 402 and receives a call for emergency service request at block 404. The method classifies the call based on the calling device identity at block 406. The call device identity can consist of but is not limited to a public id, private id, VG ID, IP address and IS_Internal flag. Block 406 is expanded in FIG. 5. The method of the illustrative embodiment classifies the call as either a fixed internal device from a registered VG with a known address at block 408, a visiting device from a VG with a known address at block 410, or a visiting device without a verifiable known address at block 412. When the method classifies the call at block 408 the call is routed to block 610 further illustrated in FIG. 6. When the method classifies the call at block 410 the call is routed to block 710 further illustrated in FIG. 7. When the method classifies the call at block 412 the call is routed to block 810 further illustrated in FIG. 8 and the call processing method is ended at block 414.

Figure 5:
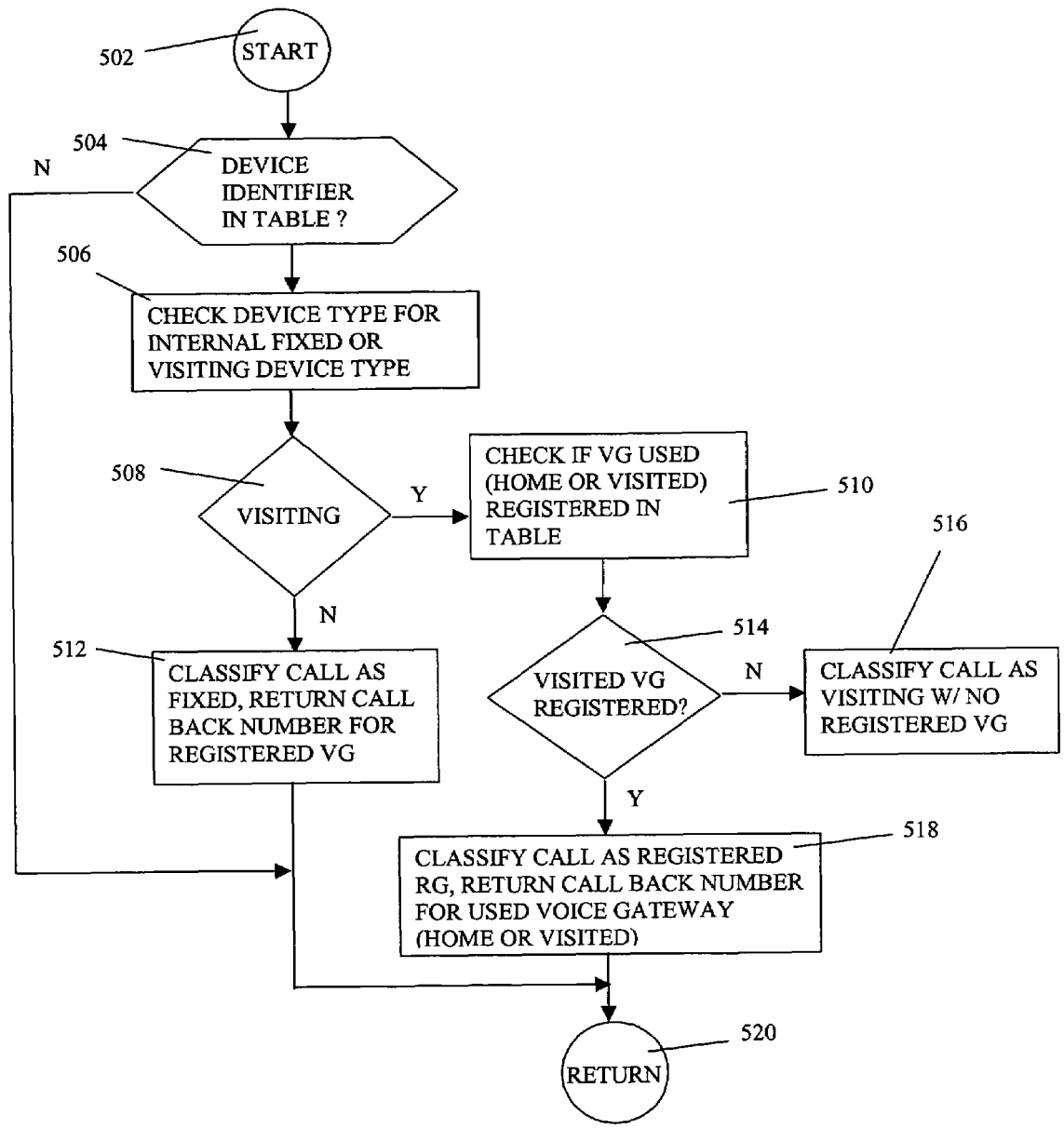
FIG. 5 is a flow chart showing call processing details for classifying an incoming call in a particular embodiment.

FIG. 5 is an expanded view of block 406 in FIG. 4. Turning now to FIG. 5, in an illustrative embodiment the method receives a call at block 502. The method uses data structure 300 (shown in FIG. 3) to identify the device type at block 504. The method determines if the device type is an internal (fixed) or visiting device at block 506. When the method determines that the device is visiting at block 508 the system determines if the VG (home or visited) is registered in the data structure 300 at block 510. The method determines if the visited VG is registered at block 514. When the method determines the VG is not registered the call is classified as visiting with no known registered VG location at block 516. When the system determines the VG is registered the call is classified as a registered VG with a known location and a return call back number for VG used (home or visited) is returned at block 518. When the system determines that the device is an internal fixed device the call is classified and a return call back number (CBN) for the registered home VG is determined at block 512.

Figure 6:
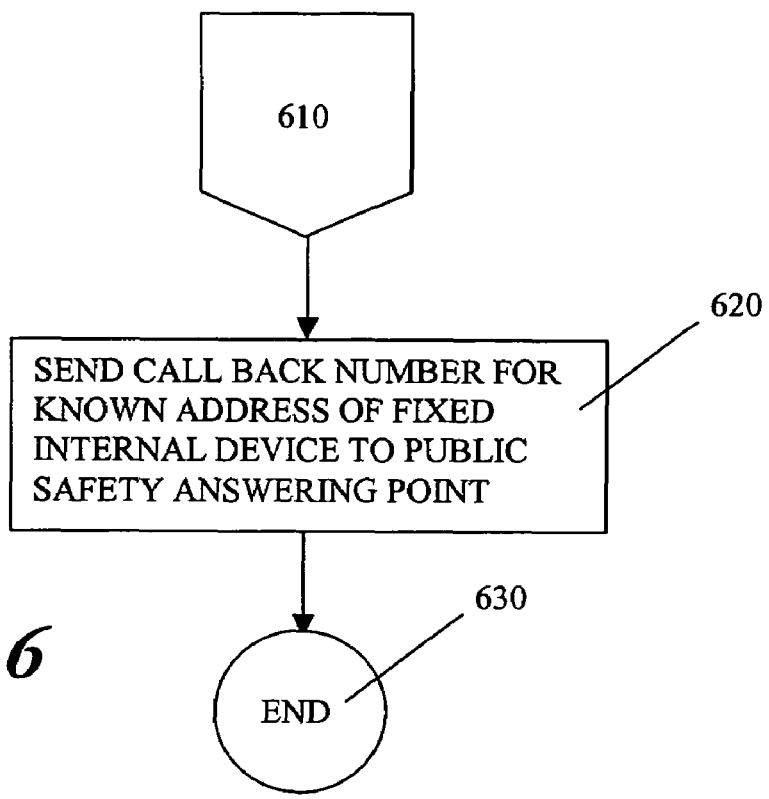
FIG. 6 is a flow chart showing call processing for a fixed known address in a particular embodiment.

Turning now to FIG. 6, in an illustrative embodiment the fixed internal device from a registered VG gate with a known location address at block 408 is routed to block 610. The call is then routed to block 620 to send the call back number for the known address of the fixed internal device to the PSAP and the method is ended at block 630.

Figure 7:
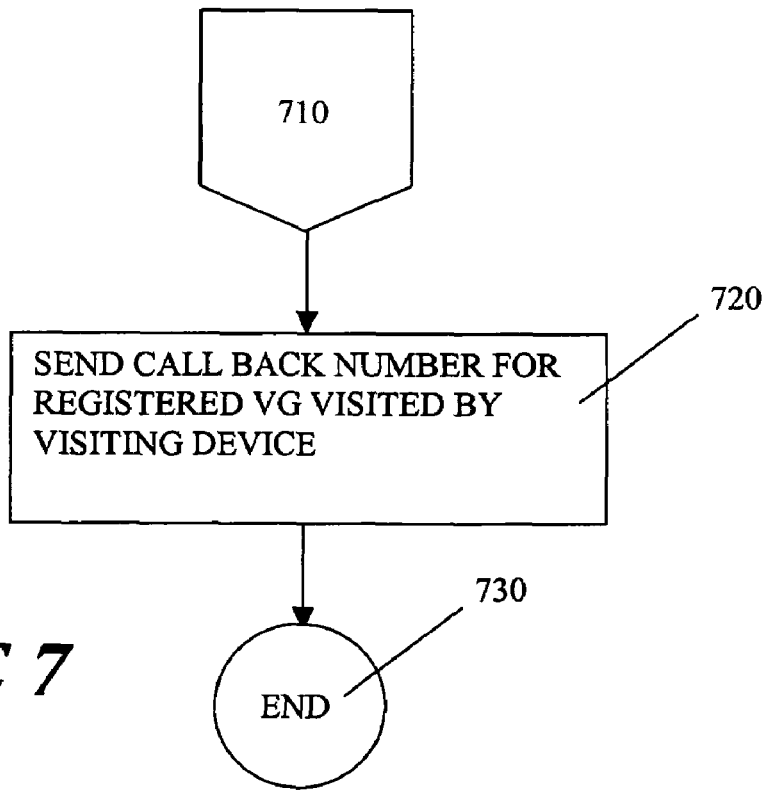
FIG. 7 is a flow chart showing call processing for a visited known address in a particular embodiment.

Turning now to FIG. 7, in an illustrative embodiment the visiting device from a registered visited or home VG with a known address at block 410 is routed to block 710. The call is then routed to block 720 to send the call back number for the registered VG (home or visited) and the method is ended at block 730.

Figure 8:
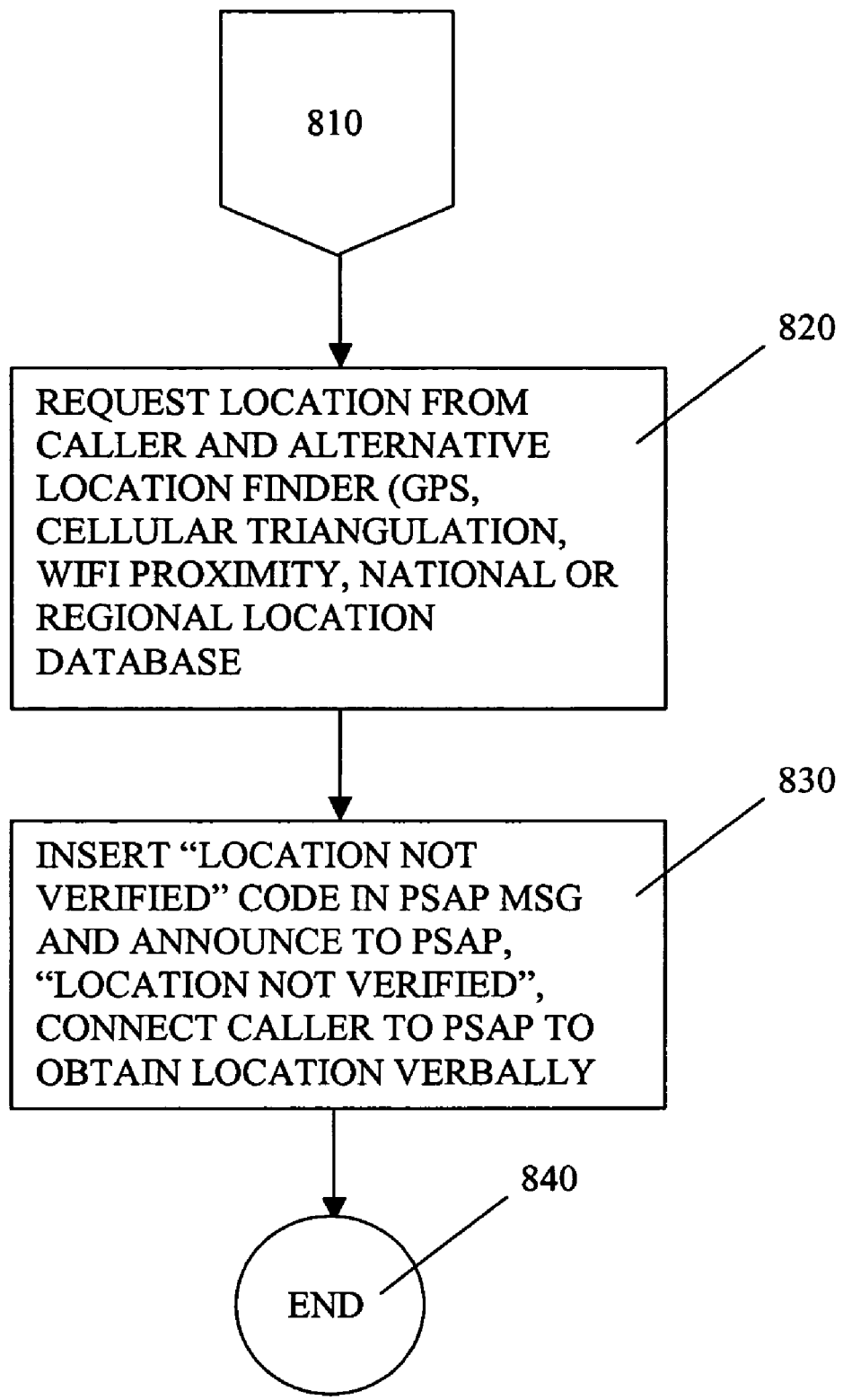
FIG. 8 is a flow chart showing call processing for an unverified location in a particular embodiment.

Turning now to FIG. 8, in an illustrative embodiment the visiting device without a known verifiable address at block 412 is routed to block 810. The method requests the location from the caller and alternative location finders consisting of but not limited to GPS, cellular triangulation, WiFi proximity, national or regional location database at block 820 and processes the information. The system registers a "location not verified" disclaimer code in PSAP message and announces to PSAP "Location Not Verified". The call is routed to PSAP to get the location verbally from the caller at block 830 and the procedure is ended at block 840.

Figure 9:
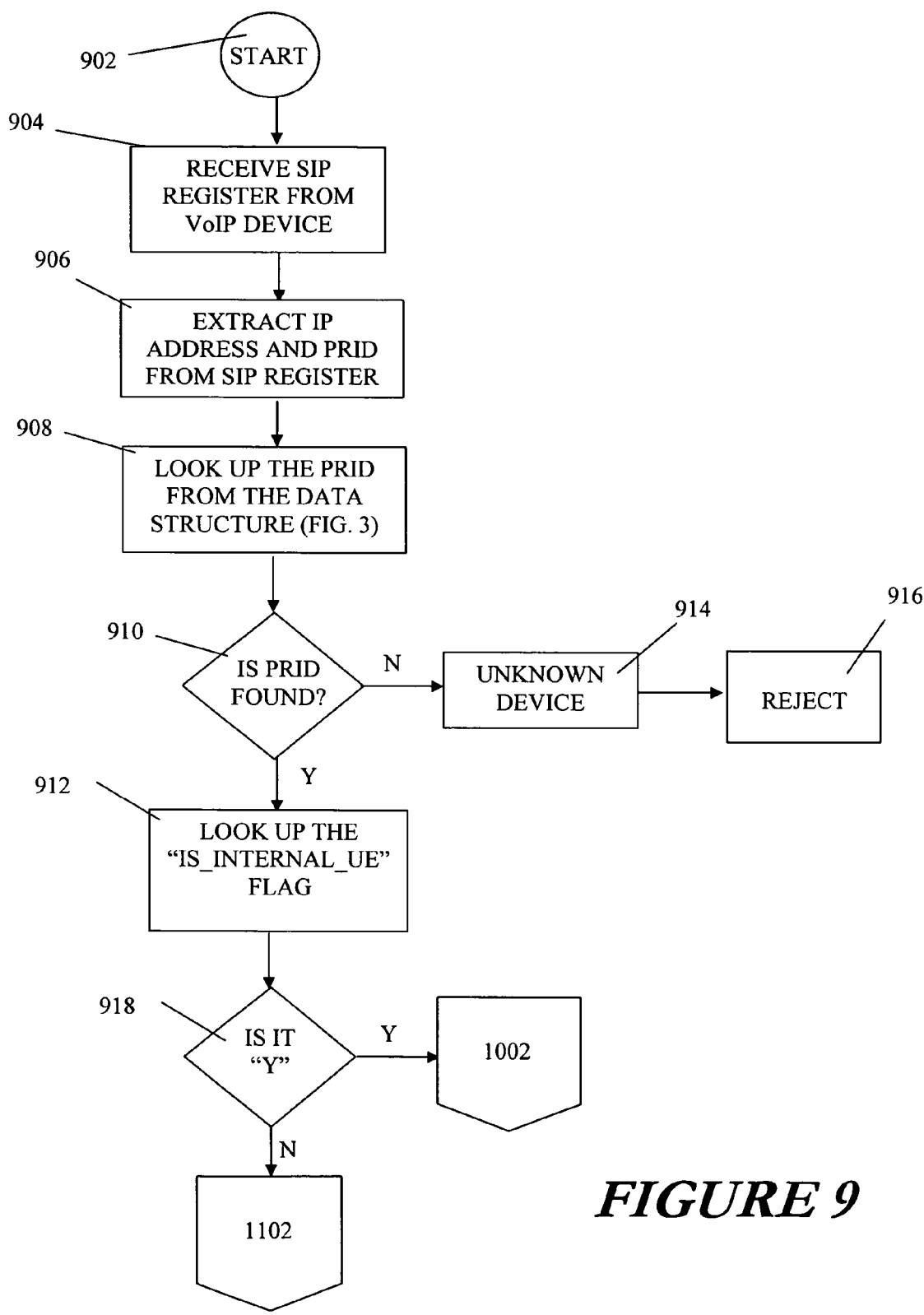
FIG. 9 is a flow chart showing call processing for a FIG. 10 is a flow chart showing call processing for a FIG. 11 is a flow chart showing call processing for a FIG. 12 is a diagrammatic representation for an illustrative embodiment in the form of a computer system.

Turning now to FIG. 9, in an illustrative embodiment wherein the system receives the SIP register from the VoIP device at block 904. The system extracts the IP address and PRID from the SIP register at block 906. The system looks up the PRID from the data structure at block 908. If the PRID is not found at block 910 and it is an unknown device at block 914, it is rejected at block 916. If the PRID is found at block 910 an "IS_Internal_UE" flag is looked up at block 912. If the flag is set to "N" at block 918 the system routes the call to block 1102 (further described in FIG. 11). If the PRID is found at block 910, the "IS_Internal_UE" flag is looked up at block 912. If the flag is set to "Y" at block 918 the system routes the call to block 1002 (further described in FIG. 10).

Figure 10:
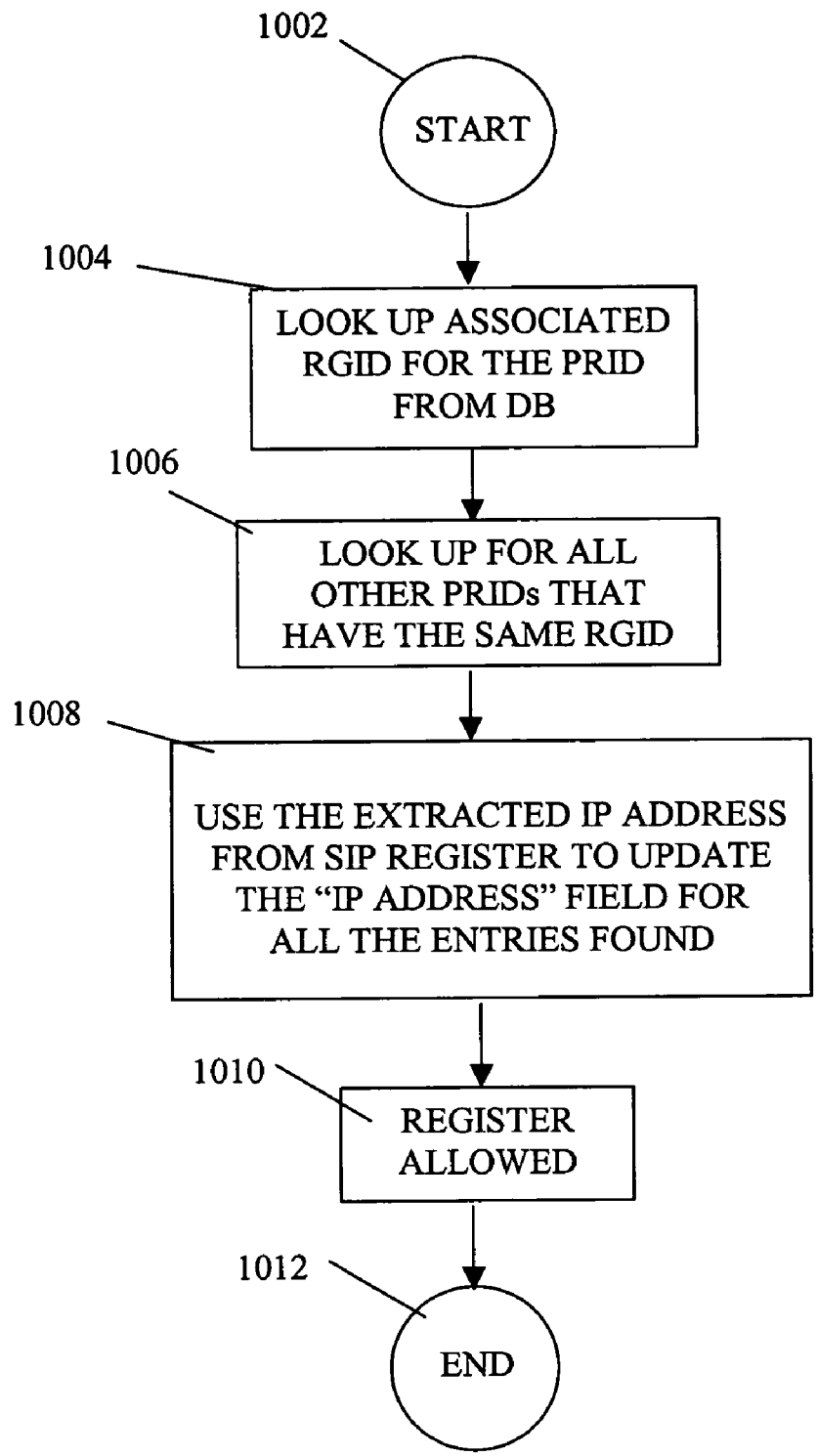

Turning now to FIG. 10, FIG. 10 is an illustrative embodiment wherein the system routes the call from block 918 (FIG. 9) to look up an associated RGID for the PRID from the database at block 1004. The system then looks up all other PRIDs that have the same RGID at block 1006. The system uses the extracted IP address from the SIP register to update the "IP Address" field for all the entries found at block 1008. Registration is allowed at block 1010 and the process flow for the device registration is ended at block 1012.

Figure 11:
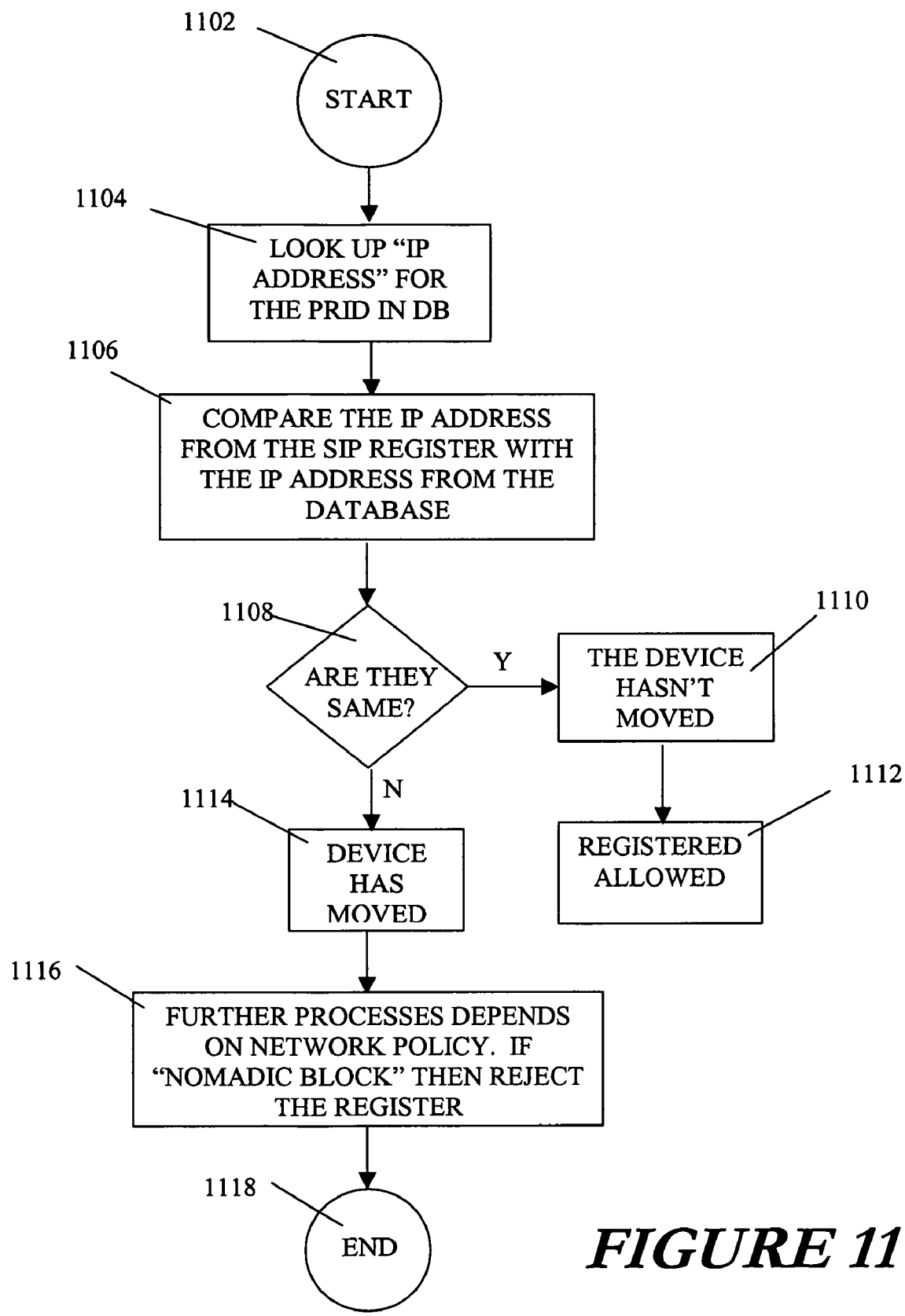

Turning now to FIG. 11, FIG. 11 is an illustrative embodiment wherein the system routes the call from block 918 (FIG. 9) to look up an "IP Address" for the PRID in the database at block 1104. The system compares the IP address from the SIP register with the IP address from the database at block 1106. The system determines if the IP addresses are the same at block 1108 and if the device hasn't moved at block 1110 the registration is allowed at block 1112. If the system determines the IP address are not the same at block 1108 and determines that the device has moved at block 1114, further processes depends on the network policy. If "Nomadic Block" is determined at block 1116 then the registration is rejected and the call is ended at block 1118.

Figure 12:
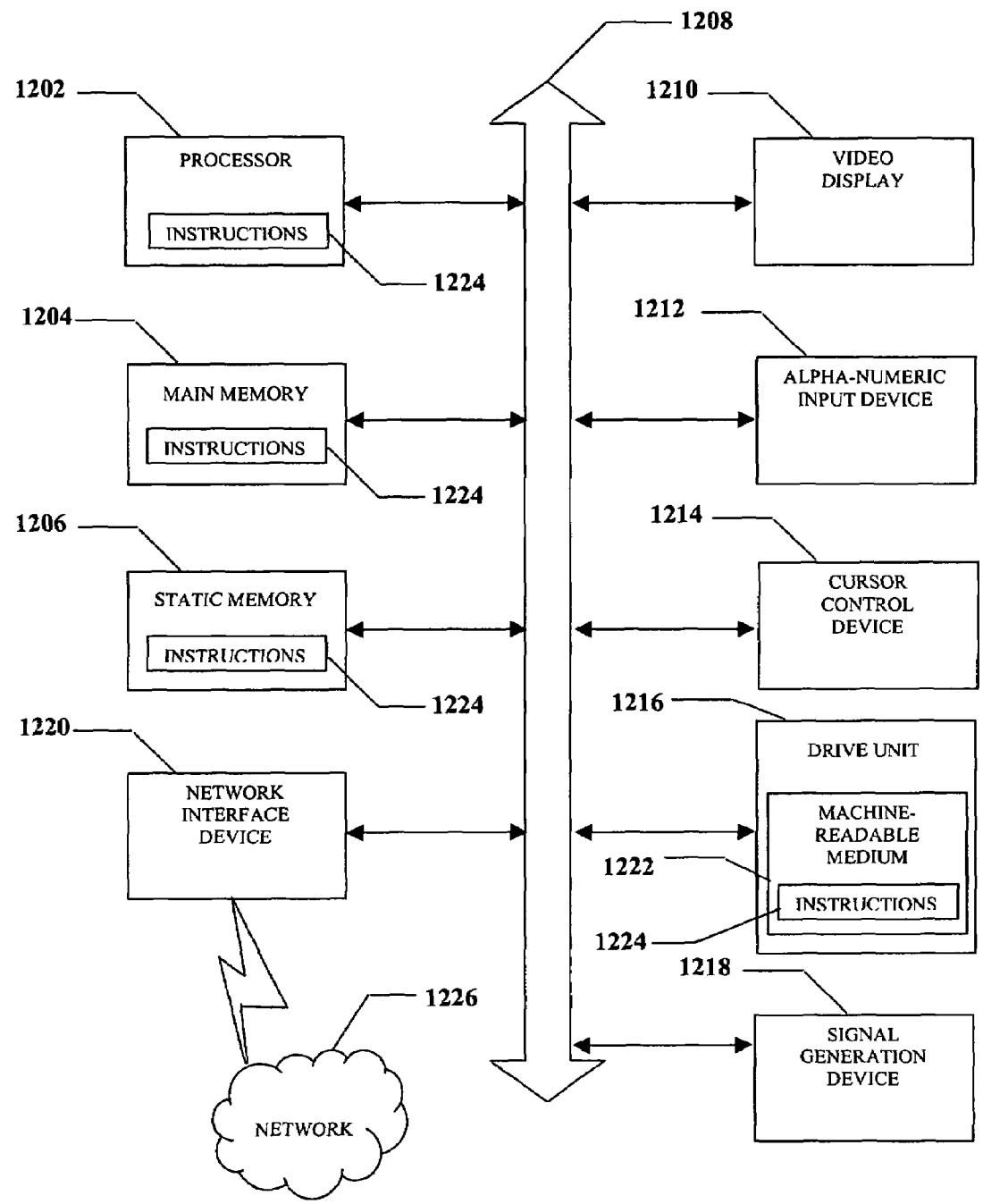

Turning now to FIG. 12, FIG. 12 is a diagrammatic representation of a machine in the form of a computer system 1200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU), or both), a main memory 1204 and a static memory 1206, which communicate with each other via a bus 1208. The computer system 1200 may further include a video display unit 1210 (e.g., a liquid crystal display (LCD), a flat panel, a solid state display, or a cathode ray tube (CRT)). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may include a machine-readable medium 1222 on which is stored one or more sets of instructions (e.g., software 1224) embodying any one or more of the methodologies or functions described herein, including those methods illustrated in herein above. The instructions 1224 may also reside, completely or at least partially, within the main memory 1204, the static memory 1206, and/or within the processor 1202 during execution thereof by the computer system 1200. The main memory 1204 and the processor 1202 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1224, or that which receives and executes instructions 1224 from a propagated signal so that a device connected to a network environment 1226 can send or receive voice, video or data, and to communicate over the network 1226 using the instructions 1224. The instructions 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects.

Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A computer readable medium containing instructions that when executed by a computer perform a method for processing call data in a Voice over internet protocol (VoIP) network, the method comprising:
   receiving at a server from a network access device, the call data containing a private identifier (PRID) datum, the PRID datum indicating a user equipment device identifier and indicating a call location mobility for the user equipment device, a public identifier (PUID) for the user equipment and a network access device identifier (NID) for the call data;
   classifying the call location mobility based on a database entry indicating the call location mobility for the user equipment device identifier indicated by the PRID, wherein the call location mobility is selected from the group consisting of:
   nomadic, fixed and visiting the PRID is provisioned at initial registration in the network, the PUID is one of the selected from the group consisting of an IP address and a telephone number and the network access device has a dynamically assigned IP address;
   processing the PRID, PUID and NID to find at least one of a matching PRID, PUID and NID;
   reading an "is internal" flag in a data structure associated with the PRID to determine if the UE associated with the PRID is fixed to particular network access device;
   determining from the NID and PRID whether the UE is at a visiting location;
   if the UE is at the fixed location, updating an IP address in the data structure for all VoIP devices having the same NID as the UE associated with the PRID; and
   sending a CBN associated with the fixed location for the UE;
   comparing a VoIP access port internet protocol address for the visiting location with a public internet protocol address in the data structure for the PRID, if the UE is at the visiting location, to determine if the VoIP access port is at a known location;
   returning a call back number for the VoIP access port if the VoIP access port is at a known location; and
   announcing to a public safety answering point (PSAP) that the location is not verified; and
   inserting a location not verified disclaimer in the call when the VoIP access port location is not at a known location, sending the call data with the call back number from the server to a public safety answering point (PSAP) based on the mobility for the user equipment device and the NID.

2. The medium of claim 1, wherein the method further comprises:
   requesting a location further from at least one of a set consisting of a caller, global positioning system (GPS), wireless fidelity (WIFI) proximity, cellular triangulation, WIFI proximity and a national database.

3. The medium of claim 1, wherein in the method the PRID is received in a session initiation protocol (SIP) message from a VoIP device to the server.

4. A system for processing a call in a Voice over internet protocol (VoIP) network comprising:
   a database in memory for storing a data structure for classifying a location mobility of a device associated with the call;
   a server coupled to the database, the server comprising:
   a first server interface to receive call data containing a PRID datum associated with the call, from a network access device, the call data containing the private identifier (PRID) datum, the PRID datum indicating a user equipment device identifier and indicating a call location mobility for the user equipment device, a public identifier (PUID) for the user equipment and a network access device identifier (NID) for the call data;
   a second server interface accesses the data base for searching for the PRID in the data structure;
   a third server interface to receive an output from the database indicating whether a PRID has been found in the data structure; and
   a fourth server interface to send the call to a PSAP with call back number (CBN) data associated with the NID) into the call data from the server to a public safety answering point (PSAP) based on the mobility for the user equipment device and the NID;
   a computer readable medium accessible to the server;
   a computer program embedded within the computer readable medium,
   the computer program comprising instructions to receive at a server from a network access device,
   instructions to call data containing a private identifier (PRID) datum, the PRID datum indicating a user equipment device identifier and indicating a call location mobility for the user equipment device identifier, a public identifier (PUID) for the user equipment and a network access device identifier (NID) for the call data;
   instructions to classify the call location mobility based on a database entry indicating the call location mobility for the user equipment device indicated by the PRID;
   instructions to process the PRID, PUID and NID to find at least one of a matching PRID, PUID and NID;
   instructions to announce to a public safety answering point (PSAP) that the location is not verified
   instructions to insert a "location not verified" disclaimer in the call when the VoIP gateway location is not known;
   instructions to insert call back number (CBN) data associated with the NID into the call data; and
   instructions to send the call data with the call back number from the server to the public safety answering point (PSAP) based on the mobility for the user equipment device and the NID.

5. The system of claim 4, wherein die first server interface receives a session initiation protocol (SIP) message containing the PRID from a VoIP device.

6. The system of claim 4, further comprising:
   a computer readable medium accessible to the server; and
   a computer program embedded within the computer readable medium, the computer program comprising:
instructions to retrieve the VG ID associated with a PRID; and
instructions to farther retrieve all other VoIP devices from the database that are associated with the same VG ID.

7. The system of claim 6 wherein the computer program further comprises:
instructions to compare a VoIP access port internet protocol address with an internet protocol address for the PRID to determine if the VoIP access port is at a known location; and
instructions to return a call back number for the VoIP access port when the VoIP access port is at a known location.

8. The system of claim 6, wherein the computer program further comprises:
instructions to request a location further from at least one of a set consisting of a caller, global positioning system (GPS), WIFI, triangulation and a national database.

* * * * *